United States Patent
Ueda et al.

(10) Patent No.: US 7,972,680 B2
(45) Date of Patent: Jul. 5, 2011

(54) RESIN COMPOSITION AND FILM

(75) Inventors: Kenichi Ueda, Nara (JP); Shigeo Otome, Kyoto (JP); Akio Naka, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 343 days.

(21) Appl. No.: 12/280,162

(22) PCT Filed: Feb. 21, 2007

(86) PCT No.: PCT/JP2007/053164
§ 371 (c)(1),
(2), (4) Date: Aug. 20, 2008

(87) PCT Pub. No.: WO2007/099826
PCT Pub. Date: Sep. 7, 2007

(65) Prior Publication Data
US 2010/0168340 A1    Jul. 1, 2010

(30) Foreign Application Priority Data
Feb. 22, 2006   (JP) .................. 2006-045950

(51) Int. Cl.
B32B 27/30 (2006.01)
C08L 33/08 (2006.01)
C08L 33/20 (2006.01)
C08L 25/04 (2006.01)

(52) U.S. Cl. ......... 428/172; 428/327; 523/201; 524/902

(58) Field of Classification Search .................. 428/327, 428/172; 523/201; 524/902
See application file for complete search history.

(56) References Cited

U.S. PATENT DOCUMENTS

| 4,789,709 A | 12/1988 | Kato et al. | |
| 6,172,135 B1 * | 1/2001 | Fraser et al. | 523/201 |
| 2002/0072552 A1 * | 6/2002 | Wills et al. | 523/340 |
| 2002/0167112 A1 * | 11/2002 | Colburn et al. | 264/211 |
| 2003/0004278 A1 | 1/2003 | Asano et al. | |
| 2006/0089462 A1 * | 4/2006 | O et al. | 525/242 |

FOREIGN PATENT DOCUMENTS

| JP | 10-072543 | 3/1998 |
| JP | 2000-178399 | 6/2000 |
| JP | 2000-302815 | 10/2000 |
| JP | 2001-040228 | 2/2001 |
| JP | 2001-151814 | 6/2001 |
| JP | 2002-060424 | 2/2002 |
| JP | 2005-162835 | 6/2005 |
| JP | 2005-281589 | 10/2005 |
| JP | 2005-314534 | 11/2005 |
| JP | 2006-171464 | 6/2006 |

OTHER PUBLICATIONS

International Search Report mailed May 22, 2007, for PCT Application No. PCT/JP2007/053164 filed Feb. 21, 2007, 4 pages.

* cited by examiner

*Primary Examiner* — Satya B Sastri
(74) *Attorney, Agent, or Firm* — Morrison & Foerster LLP

(57) ABSTRACT

To realize a resin composition which enables formation of a film having excellent film formability and bending resistance and having a small retardation. A resin composition of the present invention comprises: an acrylic resin as a main component; and organic fine particles whose average particle diameter ranges from 0.01 μm to 1 μm, wherein a glass transition temperature of the acrylic resin ranges from 110° C. to 200° C., and each of the organic fine particles has a structural unit of a vinyl cyanide monomer and a structural unit of an aromatic vinyl monomer.

5 Claims, No Drawings

RESIN COMPOSITION AND FILM

CROSS REFERENCE TO RELATED APPLICATIONS

This is a U.S. National Phase of PCT/JP2007/053164, filed Feb. 21, 2007, which claims priority to Japan Application No. 045950/2006, filed Feb. 22, 2006, both of which are hereby incorporated by reference in the present disclosure in their entirety.

TECHNICAL FIELD

The present invention relates to a resin composition and a film including the resin composition. More specifically, the present invention relates to (i) a resin composition containing organic fine particles and an acrylic resin and (ii) a film, including the resin composition, which has excellent optical property and flexibility.

BACKGROUND ART

An acrylic resin represented by PMMA is excellent in an optical property and was applied to various kinds of optical materials as an optical isotopic material having a high light transmittance, a low birefringence, and a small retardation. However, in these days, with advancement of flat displays such as a liquid crystal display device, a plasma display, and an organic EL display and advancement of infrared sensors, light guides, and the like, an optical material has been recently required to have not only excellent transparency and heat resistance but also high optical isotropy, i.e., so-called a low birefringence material has been required.

A known example of a thermoplastic resin having transparency and heat resistance is a lactone-ring-containing polymer obtained by carrying out a lactone cyclization condensation reaction with respect to a polymer having hydroxyl group and ester group in its molecular chain (see Patent Document 1 and Patent Document 2 for example).

[Patent Document 1]
Japanese Unexamined Patent Publication Tokukai 2000-230016 (Aug. 12, 2000)
[Patent Document 2]
Japanese Unexamined Patent Publication Tokukai 2000-302815 (Oct. 31, 2000)

DISCLOSURE OF INVENTION

However, the conventional arrangement raises such problem that it is difficult to obtain an optical material whose retardation is small.

Specifically, as to the lactone-ring-containing polymer, when an amount of a lactone ring structure for enhancing the heat resistance is increased, the lactone structure gives a positive retardation, so that the resultant polymer has a large retardation. Also, the lactone-ring-containing polymer is extremely brittle, which results in problems of film formability and bending resistance (flexibility).

A resin having a structural unit giving a negative retardation, e.g., an acrylonitrile-styrene resin (AS resin) or the like may be blended, but this arrangement fails to sufficiently improve the brittleness. This results in problems of the film formability and the bending resistance.

The present invention was made in view of the foregoing problems, and an object of the preset invention is to realize (i) a resin composition enabling formation of a film which has excellent film formability and bending resistance and whose retardation is small and (ii) a film including the resin composition.

In order to solve the foregoing problems, a resin composition according to the present invention comprising: an acrylic resin as a main component; and organic fine particles whose average particle diameter ranges from 0.01 μm to 1 μm, wherein a glass transition temperature of the acrylic resin ranges from 110° C. to 200° C., and each of the organic fine particles has a structural unit of a vinyl cyanide monomer and a structural unit of an aromatic vinyl monomer.

According to the arrangement, the acrylic resin has excellent heat resistance. Further, each of the organic fine particles has a structural unit of a vinyl cyanide monomer and a structural unit of an aromatic vinyl monomer, so that a film made of the acrylic resin has excellent film formability and bending resistance (flexibility) and its retardation is small. Thus, it is possible to provide a resin composition enabling formation of a film which has excellent film formability and bending resistance and whose retardation is small.

It is preferable to arrange the resin composition according to the present invention so that the acrylic resin has a lactone ring structure.

According to the arrangement, it is possible to exhibit such further effect that the heat resistance can be enhanced without significantly deteriorating the optical property.

It is preferable to arrange the resin composition according to the present invention so that an amount of the acrylic resin ranges from 50 to 95 wt %, and an amount of the organic fine particles ranges from 5 to 50 wt %.

According to the arrangement, it is possible to obtain such further effect that it is possible to provide a resin composition enabling formation of a film which has excellent film formability and bending resistance and whose retardation is small.

Further, it is preferable to arrange the resin composition according to the present invention so that a haze is 5% or less in case where a film made of the resin composition has a thickness of 100 μm.

Further, it is preferable to arrange the resin composition according to the present invention so that a film made of the resin composition has an in-plane retardation of 10 nm or less per 100 μm thickness.

Further, it is preferable to arrange the resin composition according to the present invention so that each of the organic fine particles has a crosslinked structure.

According to the arrangement, each of the organic fine particles shows crosslinked elasticity, so that it is possible to provide a film having excellent bending resistance.

Further, it is preferable to arrange the resin composition according to the present invention so that
the acrylic resin has a structure represented by General Formula (1)

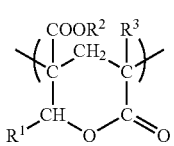

(1)

where each of $R^1$, $R^2$, and $R^3$ independently represents a hydrogen atom or an organic residue whose carbon number ranges from 1 to 20, and the organic residue may contain an oxygen atom.

In order to solve the foregoing problems a film according to the present invention comprises the resin composition according to the present invention.

According to the arrangement, it is possible to provide a film which has excellent film formability and bending resistance and whose retardation is small.

BEST MODE FOR CARRYING OUT THE INVENTION

The following description will detail the present invention, but the scope of the present invention is not limited to the description, and the embodiments may be varied in many ways so as not to depart from the spirit and scope of the invention.

A resin composition according to the present invention comprises: an acrylic resin as a main component; and organic fine particles whose average particle diameter ranges from 0.01 μm to 1 wherein a glass transition temperature of the acrylic resin ranges from 110° C. to 200° C., and each of the organic fine particles has a structural unit of a vinyl cyanide monomer and a structural unit of an aromatic vinyl monomer.

Note that, the term "foreign substance" used in the specification refers to all the substances which are not soluble with respect to the resin composition and the film, e.g., (i) contaminants mixed at all the steps for producing a film from a raw material, (ii) by-products such as gel generated during a polymerization reaction, (iii) clumps of organic fine particles, (iv) by-products caused by deterioration of a resin at the time of film formation, and (v) similar substances.

Further, in the present specification, "weight" is a synonymous of "mass". Further, "wt %" is synonymous of "mass %". Further, such wording that "ranges (ranging) from A to B" refers to such condition that "not less than A and not more than B".

Further, the term "main component" refers to such condition that 50 wt % or more of a certain substance is included. That is, in the resin composition, the acrylic resin is included so that its amount ranges from 50 wt % to a value indicated by (100 wt %–wt % of the organic fine particles in the resin composition).

(I) Acrylic Resin

The acrylic resin is not particularly limited as long as the resin is obtained by polymerizing a monomer composition containing (meth)acrylic ester as a main component. As (meth)acrylic ester, a compound (monomer) having a structure represented by General Formula (2)

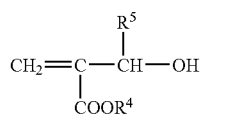

(2)

where each of $R^4$ and $R^5$ independently represents a hydrogen atom or an organic residue whose carbon number ranges from 1 to 20.

Examples of (meth)acrylic ester include: acrylic ester such as methyl acrylate, ethyl acrylate, n-butyl acrylate, isobutyl acrylate, t-butyl acrylate, cyclohexyl acrylate, and benzyl acrylate; methacrylate such as methyl methacrylate, ethyl methacrylate, propyl methacrylate, n-butyl methacrylate, isobutyl methacrylate, t-butyl methacrylate, cyclohexyl methacrylate, and benzyl methacrylate; and the like. These compounds may be used solely or may be used in a combination of two or more kinds. Above all, it is more preferable to use methyl methacrylate, the compound having a structure represented by General Formula (2), due to its excellent heat resistance and transparency.

Examples of the compound having a structure represented by General Formula (2) include methyl 2-(hydroxymethyl) acrylate, ethyl 2-(hydroxymethyl)acrylate, isopropyl 2-(hydroxymethyl)acrylate, n-butyl 2-(hydroxymethyl)acrylate, t-butyl 2-(hydroxymethyl)acrylate, and the like. Above all, it is preferable to use methyl 2-(hydroxymethyl)acrylate and ethyl 2-(hydroxymethyl)acrylate, and it is particularly preferable to use methyl 2-(hydroxymethyl)acrylate since it can so effectively improve the heat resistance. The compounds each of which has a structure represented by General Formula (2) may be solely used or may be used in a combination of two or more kinds.

The acrylic resin may have a structure other than the aforementioned structure obtained by polymerizing (meth)acrylic ester. The structure other than the aforementioned structure obtained by polymerizing (meth)acrylic ester is not particularly limited, but it is preferable to adopt a polymer structural unit (repeated structural unit) obtained by polymerizing at least one kind selected from a monomer containing hydroxyl group, unsaturated carboxylic acid, and a monomer represented by General Formula (3)

(3)

where $R^6$ represents a hydrogen atom or a methyl group, and X represents a hydrogen atom, an alkyl group whose carbon number ranges from 1 to 20, an aryl group, —OAc group, —CN group, —CO—$R^7$ group, or —C—O—$R^8$ group, and an Ac group represents an acetyl group, and each of $R^7$ and $R^8$ represents a hydrogen atom or an organic residue whose carbon number ranges from 1 to 20.

The monomer containing hydroxyl group is not particularly limited as long as the monomer is not the monomer represented by General Formula (2). Examples thereof include: α-hydroxymethylstyrene, α-hydroxyethylstyrene, methyl 2-(hydroxyethyl)acrylate; 2-(hydroxyalkyl)acrylic acid such as 2-(hydroxyethyl)acrylic acid; and the like. These monomers may be used solely or may be used in a combination of two or more kinds.

Examples of the unsaturated carboxylic acid include acrylic acid, methacrylic acid, crotonic acid, α-substituted acrylic acid, α-substituted methacrylic acid, and the like. These substances may be used solely or may be used in a combination of two or more kinds. Above all, it is preferable to use acrylic acid and methacrylic acid in sufficiently exhibiting the effect of the present invention.

Examples of the compound represented by General Formula (3) include styrene, vinyl toluene, α-methylstyrene, acrylonitrile, methylvinylketone, ethylene, propylene, vinyl acetate, and the like. These compounds may be used solely or may be used in a combination of two or more kinds. Above all, it is particularly preferable to use styrene and α-methylstyrene in sufficiently exhibiting the effect of the present invention.

In case where the acrylic resin is a resin obtained by polymerizing a monomer containing a compound whose structure is represented by General Formula (2), it is more preferable that the acrylic resin has a lactone ring structure (hereinafter, the acrylic resin having the lactone ring structure is referred to as "lactone-ring-containing polymer"). The lactone-ring-containing polymer is described as follows.

An example of the lactone structure is a structure represented by General Formula (1)

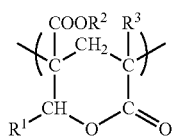

(1)

where each of $R^1$, $R^2$, and $R^3$ independently represents a hydrogen atom or an organic residue whose carbon number ranges from 1 to 20, and the organic residue may include an oxygen atom.

Note that, the organic residue in General Formulas (1), (2), and (3) is not particularly limited as long as its carbon number ranges from 1 to 20. Examples thereof include a normal-chain or branched alkyl group, a normal-chain or branched alkylene group, an aryl group, —OAc group, —CN group, and the like.

An amount of the lactone ring structure included in the acrylic resin preferably ranges from 5 to 90 wt %, more preferably from 10 to 70 wt %, still more preferably from 10 to 60 wt %, particularly preferably from 10 to 50 wt %. When the amount of the lactone ring structure is less than 5 wt %, the heat resistance, the solution resistance, and the surface hardness may be insufficient, so that such setting of the amount is not preferable. When the amount of the lactone ring structure is more than 90 wt %, the film formation workability is likely to drop, so that such setting of the amount is not preferable.

As to the lactone-ring-containing polymer, an amount of a structure other than the lactone ring structure represented by General Formula (1) preferably ranges from 10 to 95 wt %, more preferably from 10 to 90 wt %, still more preferably from 40 to 90 wt %, particularly preferably from 50 to 90 wt %, in case of a polymer structural unit (repeated structural unit) obtained by polymerizing (meth)acrylic ester.

Further, in case of a polymer structural unit (repeated structural unit) obtained by polymerizing a monomer containing hydroxyl group, the amount of the structure other than the lactone ring structure represented by General Formula (1) preferably ranges from 0 to 30 wt %, more preferably from 0 to 20 wt %, still more preferably from 0 to 15 wt %, particularly preferably from 0 to 10 wt %.

Further, in case of a polymer structural unit (repeated structural unit) obtained by polymerizing unsaturated carboxylic acid, the amount of the structure other than the lactone ring structure represented by General Formula (1) preferably ranges from 0 to 30 wt %, more preferably from 0 to 20 wt %, still more preferably from 0 to 15 wt %, particularly preferably from 0 to 10 wt %.

Further, in case of a polymer structural unit (repeated structural unit) obtained by polymerizing a monomer represented by General Formula (3), the amount of the structure other than the lactone ring structure represented by General Formula (1) preferably ranges from 0 to 30 wt %, more preferably from 0 to 20 wt %, still more preferably from 0 to 15 wt %, particularly preferably from 0 to 10 wt %.

A method for producing the lactone-ring-containing polymer is not particularly limited. However, it is preferable to carry out the following process. After obtaining a polymer having hydroxyl group and ester group in its molecular chain at a polymerization step, the resultant polymer is heated so as to introduce the lactone structure into the polymer as a lactone cyclization condensation step, thereby obtaining the lactone-ring-containing polymer.

A polymerization reaction is carried out with respect to a monomer composition containing the compound represented by General Formula (2), thereby obtaining a polymer having hydroxyl group and ester group in its molecular chain.

An amount of the compound represented by General Formula (2) in the monomer composition at the time of the polymerization reaction (polymerization step) preferably ranges from 5 to 90 wt %, more preferably from 10 to 70 wt %, still more preferably from 10 to 60 wt %, particularly preferably from 10 to 50 wt %. When the amount of the monomer represented by General Formula (2) in the monomer component at the polymerization step is less than 5 wt %, the heat resistance, the solution resistance, and the surface hardness may be insufficient, so that such setting of the amount is not preferable. When the amount of the monomer represented by General Formula (2) in the monomer component at the polymerization step is more than 90 wt %, the resultant may be gelatinous at the time of polymerization or lactone cyclization, or the workability in processing the resultant polymer may drop, so that such setting of the amount is not preferable.

In the monomer composition used at the polymerization step, a monomer other than the monomer represented by General Formula (2) may be included. Examples of the monomer include the aforementioned (meth)acrylic ester, the monomer containing hydroxyl group, the unsaturated carboxylic acid, and the monomer represented by General Formula (3). The monomers other than the monomer represented by General Formula (2) may be used solely or may be used in a combination of two or more kinds.

In case of using (meth)acrylic ester other than the monomer represented by General Formula (2), an amount of (meth) acrylic ester included in the monomer component used at the polymerization step preferably ranges from 10 to 95 wt %, more preferably from 10 to 90 wt %, still more preferably from 40 to 90 wt %, particularly preferably from 50 to 90 wt %, in sufficiently exhibiting the effect of the present invention.

In case of using the monomer containing hydroxyl group other than the monomer represented by General Formula (2), an amount of the monomer included in the monomer component used at the polymerization step preferably ranges from 0 to 30 wt %, more preferably from 0 to 20 wt %, still more preferably from 0 to 15 wt %, particularly preferably from 0 to 10 wt %, in sufficiently exhibiting the effect of the present invention.

In case of using the unsaturated carboxylic acid, an amount thereof in the monomer component used at the polymerization step preferably ranges from 0 to 30 wt %, more preferably from 0 to 20 wt %, still more preferably from 0 to 15 wt %, particularly preferably from 0 to 10 wt %, in sufficiently exhibiting the effect of the present invention.

In case of using the monomer represented by General Formula (3), an amount thereof in the monomer component used at the polymerization step preferably ranges from 0 to 30 wt %, more preferably from 0 to 20 wt %, still more preferably from 0 to 15 wt %, particularly preferably from 0 to 10 wt %, in sufficiently exhibiting the effect of the present invention.

As the polymerization reaction for obtaining the polymer having hydroxyl group and ester group in its molecular chain by polymerizing the monomer composition, it is preferable to adopt polymerization using a solvent, and it is particularly preferable to adopt solution polymerization.

A polymerization temperature and a polymerization duration vary depending on a type of a monomer used (monomer composition), a ratio thereof, and the like, but it is preferable that the polymerization temperature ranges from 0 to 150° C. and the polymerization duration ranges from 0.5 to 20 hours, and it is more preferable that the polymerization temperature ranges from 80 to 140° C. and the polymerization duration ranges from 1 to 10 hours.

In case of adopting the polymerization using a solvent, a polymerization solvent is not particularly limited, and examples of the polymerization solvent include: aromatic hydrocarbon solvent such as toluene, xylene, and ethylbenzene; ketone solvent such as methylethylketone, and methylisobutylketone; ether solvent such as tetrahydrofuran; and the like. These solvents may be used solely or may be used in a combination of two or more kinds. Further, when a boiling point of the solvent used is too high, there occurs a large amount of residual volatile matter of the resultant lactone-ring-containing polymer, so that it is preferable to use a solvent whose boiling point ranges from 50 to 200° C.

At the time of polymerization reaction, a polymerization initiator may be added as necessary. The polymerization initiator is not particularly limited, but examples thereof include: organic peroxide such as cumene hydroperoxide, diisopropylbenzene hydroperoxide, di-t-butylperoxide, lauroylperoxide, benzoylperoxide, t-butylperoxyisopropylcarbonate, and t-amylperoxy-2-ethylhexanoate; azo compound such as 2,2'-azobis(isobutylonitrile), 1,1'-azobis(cyclohexanecarbonitrile), and 2,2'-azobis(2,4-dimethylvaleronitrile); and the like. They may be used solely or may be used in a combination of two or more kinds. An amount of the polymerization initiator may be suitably set according to a combination of monomers used and a reaction condition and is not particularly limited.

In carrying out the polymerization, it is preferable to control a concentration of the polymer generated in the polymerization reaction mixture so that the concentration is 50 wt % or less in order to prevent the gel formation of the reaction liquid. Specifically, in case where the concentration of the polymer generated in the polymerization reaction mixture exceeds 50 wt %, it is preferable to suitably add the polymerization solvent to the polymerization reaction mixture so that the concentration is 50 wt % or less. The concentration of the polymer generated in the polymerization reaction mixture is preferably 45 wt % or less, more preferably 40 wt % or less. Note that, when the concentration of the polymer in the polymerization reaction mixture is too low, the productivity drops, so that the concentration of the polymer in the polymerization reaction mixture is preferably 10 wt % or more, more preferably 20 wt % or more.

A manner in which the polymerization solvent is suitably added to the polymerization reaction mixture is not particularly limited. The polymerization solvent may be continuously added, or the polymerization solvent may be intermittently added. By controlling the concentration of the polymer generated in the polymerization reaction mixture in this manner, it is possible to more sufficiently prevent the gel formation of the reaction liquid. Particularly, even in case where a ratio of the hydroxyl group and ester group in the molecular chain is increased which results in increase of a ratio of the contained lactone ring so that the heat resistance is enhanced, it is possible to sufficiently prevent the gel formation. As the polymerization solvent used, the same kind of solvent as the solvent used at the initial stage for preparing the polymerization reaction may be used, or a different kind of solvent may be used. It is preferable to use the same kind of solvent as the solvent used at the initial stage for preparing the polymerization reaction. Further, a single kind of solvent may be used as the polymerization solvent added, or two or more kinds of solvents may be used.

The polymer obtained at the aforementioned polymerization step is a polymer having, in its molecular chain, ester group (hydroxyl group and ester group in case where the polymer is obtained by polymerizing the monomer containing the compound whose structure is represented by General Formula (2)), and a weight average molecular weight of the polymer preferably ranges from 1,000 to 2,000,000, more preferably from 5,000 to 1,000,000, more preferably from 10,000 to 500,000, particularly preferably from 50,000 to 500,000.

By using the polymer obtained by polymerizing the monomer containing the compound whose structure is represented by General Formula (2), at the subsequent lactone cyclization condensation step, it is possible to introduce the lactone ring structure into the polymer, thereby preparing the lactone-ring-containing polymer.

In the polymerization reaction mixture obtained at the time of completion of the polymerization step, not only the resultant polymer but also solvent is generally included. In case of using the lactone-ring-containing polymer as the aforementioned polymer, it is not necessary to retrieve the polymer in a solid phase by completely removing the solvent, and it is preferable to carry out the subsequent lactone cyclization condensation step with the polymer including the solvent. Further, if necessary, a solvent suitable for the subsequent lactone cyclization condensation step may be further added after retrieving the polymer in the solid phase.

The reaction for introducing the lactone ring structure into the polymer is such that a heat treatment causes cyclization condensation of the hydroxyl group and ester group in the molecular chain of the polymer so as to generate the lactone ring structure. The cyclization condensation results in generation of alcohol as its by-product. The lactone ring structure is formed in the molecular chain of the polymer (in a main backbone of the polymer), so that high heat resistance is given to the polymer. If a reactivity of the cyclization condensation reaction for allowing formation of the lactone ring structure is insufficient, the heat resistance may be insufficiently improved, or a heat treatment at the time of the film formation may cause a condensation reaction during the film formation, which may result in such condition that the generated alcohol exists in the resultant product as bubbles or silver streaks. Thus, the insufficient reactivity is not preferable.

The lactone-ring-containing polymer obtained at the lactone cyclization condensation step preferably has the lactone ring structure represented by General Formula (1).

A method for heating the polymer is not particularly limited, and a known method may be adopted. For example, the polymerization reaction mixture obtained at the polymerization step and including the solvent may be heated without any modification. Further, in the presence of the solvent, the polymerization reaction mixture may be heated by using a ring-closing catalyst as necessary. Further, an oven or a reaction device equipped with a vacuum device or a devolatilization device which removes a volatile matter, an extruder equipped with a devolatilization device, or a similar device can be used to carry out the heat treatment.

In carrying out the cyclization condensation reaction, not only the polymer but also other acrylic resin may coexist. Further, in carrying out the cyclization condensation reaction, an esterification catalyst or an ester exchange catalyst such as p-toluenesulfonic acid or the like generally used as a catalyst for the cyclization condensation reaction may be used, or organic carboxylic acids such as acetic acid, propionic acid, benzoic acid, acrylic acid, and methacrylic acid may be used. As shown in Japanese Unexamined Patent Document Tokukaisho 61-254608 and Japanese Unexamined Patent Document Tokukaisho 61-261303, basic compound, organic carboxylate, carbonate, and the like may be used.

In carrying out the cyclization condensation reaction, it is preferable to use organic phosphorous compound as the catalyst. By using the organic phosphorous compound as the catalyst, it is possible to improve the cyclization condensation reactivity and it is possible to suppress coloring of the resultant lactone-ring-containing polymer. Further, by using the organic phosphorous compound as the catalyst, it is possible to suppress decrease of a molecular weight which may occur in case of carrying out a below-described devolatilization step together, so that it is possible to give excellent mechanical strength.

Examples of the organic phosphorous compound usable as the catalyst in carrying out the cyclization condensation reaction include: alkyl(aryl)phosphonous acids, such as methyl phosphonous acid, ethyl phosphonous acid, and phenyl phosphonous acid, (including their tautomers, i.e. alkyl(aryl) phosphinic acids), their diesters, and monoesters; dialkyl)-aryl) phosphinic acids, such as dimethyl phosphinic acid, diethyl phosphinic acid, diphenyl phosphinic acid, phenyl methyl phosphinic acid, and phenyl ethyl phosphinic acid, and their esters; alkyl(aryl) phosphonic acids, such as methyl phosphonic acid, ethyl phosphonic acid, trifluoromethyl phosphonic acid, and phenyl phosphonic acid, and their diesters and monoesters; alkyl(aryl) phosphinous acids, such as methyl phosphinous acid, ethyl phosphinous acid, and phenyl phosphinous acid, and their esters; phosphite diesters, phosphite monoesters, and phosphite triesters, such as methyl phosphite, ethyl phosphite, phenyl phosphite, dimethyl phosphite, diethyl phosphite, diphenyl phosphite, trimethyl phosphite, triethyl phosphite, and triphenyl phosphite; phosphate diesters, phosphate monoesters and triesters, such as methyl phosphate, ethyl phosphate, 2-ethylhexyl phosphate, isodecyl phosphate, lauryl phosphate, stearyl phosphate, isostearyl phosphate, phenyl phosphate, dimethyl phosphate, diethyl phosphate, di-2-ethylhexyl phosphate, diisodecyl phosphate, dilauryl phosphate, distearyl phosphate, diisostearyl phosphate, diphenyl phosphate, trimethyl phosphate, triethyl phosphate, triisodecyl phosphate, trilauryl phosphate, tristearyl phosphate, triisostearyl phosphate, and triphenyl phosphate; monoalkyl(aryl) phosphines, dialkyl(aryl) phosphine, and trialkyl(aryl) phosphines, such as methyl phosphine, ethyl phosphine, phenyl phosphine, dimethyl phosphine, diethyl phosphine, diphenyl phosphine, trimethyl phosphine, triethyl phosphine, and triphenyl phosphine; alkyl (aryl) phosphine halides, such as methyl phosphine dichloride, ethyl phosphine dichloride, phenyl phosphine dichloride, dimethyl phosphine chloride, diethyl phosphine chloride, and diphenyl phosphine chloride; monoalkyl(aryl) phosphine oxides, dialkyl(aryl) phosphine oxides, and trialkyl(aryl) phosphine oxides, such as methyl phosphine oxide, ethyl phosphine oxide, phenyl phosphine oxide, dimethyl phosphine oxide, diethyl phosphine oxide, diphenyl phosphine oxide, trimethyl phosphine oxide, triethyl phosphine oxide, and triphenyl phosphine oxide; tetraalkyl(aryl) phosphonium halides, such as tetramethyl phosphonium chloride, tetraethyl phosphonium chloride, and tetraphenyl phosphonium chloride. For high catalyst activity and low coloring, preferred examples are alkyl(aryl)phosphonous acids, phosphite diesters and monoesters, phosphate diesters, phosphate monoesters, and alkyl(aryl) phosphonic acids; particularly preferred ones are alkyl(aryl)phosphonous acids, phosphite diesters and monoesters, phosphate diesters, and phosphate monoesters; more preferred ones are alkyl(aryl) phosphonous acids, phosphate diesters, and phosphate monoesters. These organic phosphorous compounds may be used solely or may be used in a combination of two or more kinds.

An amount of the catalyst used in the cyclization condensation reaction is not particularly limited, but the amount preferably ranges from 0.001 to 5 wt %, more preferably from 0.01 to 2.5 wt %, still more preferably from 0.01 to 1 wt %, particularly preferably from 0.05 to 0.5 wt %, with respect to the polymer. When the amount of the catalyst is less than 0.001 wt %, it may be impossible to sufficiently improve the cyclization condensation reactivity. On the other hand, when the amount of the catalyst exceeds 5 wt %, this causes the coloring or this makes it difficult to melt and dilute the catalyst due to the crosslinking of the polymer, so that such setting of the amount is not preferable.

A timing for adding the catalyst is not particularly limited, and the addition may be carried out at the initial state of the reaction or may be carried out during the reaction or may be carried out at both these timings.

It is preferable that the cyclization condensation reaction is carried out in the presence of the solvent and the devolatilization step is carried out together in carrying out the cyclization condensation reaction. In this case, it may be so arranged that the devolatilization step is carried out together throughout the cyclization condensation reaction, or it may be so arranged that the cyclization condensation reaction is carried out together not throughout the whole steps of the cyclization condensation reaction but only in part of the steps. In the method carrying out the devolatilization step together, alcohol generated in the cyclization condensation reaction as a by-product is forcibly devolatilized so as to be removed, so that balance of the reaction is advantageous in view of product generation.

The devolatilization step is a step for removing volatile matter of the solvent, the residual monomer, and the like and for removing alcohol, generated in the cyclization condensation reaction resulting in lactone cyclization as a by-product, under a reduced pressure and a heated condition as necessary. When the removal treatment is not sufficiently carried out, there occurs a large amount of residual volatile matter of the resultant resin, which may result in such problem that degeneration or the like in the film formation causes the resin to be colored or there occurs an unfavorable film formation condition such as bubbles or silver streaks.

In case of carrying out the devolatilization step together throughout the cyclization condensation reaction, a device used therein is not particularly limited. However, in order to more effectively carry out the present invention, it is preferable to use a devolatilization device having a cooling unit and a devolatilization vessel or to use an extruder with vent, or it is preferable to use a device in which the devolatilization device and the extruder are disposed in series, and it is more preferable to use a devolatilization device has a cooling unit and a devolatilization vessel or to use an extruder with vent which extruder.

A reaction treatment temperature in case of using the devolatilization device having the cooling unit and the devolatilization vessel preferably ranges from 150 to 350° C., more preferably from 200 to 300° C. When the reaction treatment temperature is lower than 150° C., the cyclization condensation reaction is not sufficiently carried out, so that a large amount of volatile matter may remain. When the reaction treatment temperature is higher than 350° C., coloring or decomposition may occur.

A pressure at the time of the reaction treatment in case of using the devolatilization device having the cooling unit and the devolatilization vessel preferably ranges from 931 to 1.33 hPa (700 to 1 mmHg), more preferably from 798 to 66.5 hPa (600 to 50 mmHg). When the pressure is higher than 931 hPa, this raises such problem that a volatile matter including alcohol is likely to remain. When the pressure is lower than 1.33 hPa, this raises such problem that it is difficult to industrially carry out the present invention.

In case of using the extruder with vent, a single vent may be provided or a plurality of vents may be provided, but it is more preferable that a plurality of vents are provided.

A reaction treatment temperature in case of using the extruder with vent preferably ranges from 150 to 350° C., more preferably from 200 to 300° C. When the reaction treatment temperature is lower than 150° C., the cyclization condensation reaction is not sufficiently carried out, so that a large amount of volatile matter may remain. When the reaction treatment temperature is higher than 350° C., coloring or decomposition may occur.

A pressure at the time of reaction treatment in case of using the extruder with vent preferably ranges from 931 to 1.33 hPa (700 to 1 mmHg), more preferably from 798 to 13.3 hPa (600 to 10 mmHg). When the pressure is higher than 931 hPa, this raises such problem that a volatile matter including alcohol is likely to remain. When the pressure is lower than 1.33 hPa, this raises such problem that it is difficult to industrially carry out the present invention.

Note that, in case of carrying out the devolatilization step together throughout the cyclization condensation reaction, as described below, a property of the resultant lactone-ring-containing polymer under a strict heat treatment condition may deteriorate, so that it is preferable to use the dealcoholization reaction catalyst and to use the extruder with vent or the like under a condition as mild as possible.

Further, in case of carrying out the devolatilization step throughout the cyclization condensation reaction, it is preferable to introduce the polymer obtained at the polymerization step into the cyclization condensation reaction device as well as the solvent. In this case, the polymer may be placed in the reaction device system such as the extruder with vent or the like again as necessary.

The devolatilization step may be carried out not throughout the whole steps of the cyclization condensation reaction but only in part of the steps. For example, the device having produced the polymer is further heated, and the devolatilization step is partially carried out together as necessary, and the cyclization condensation reaction is promoted in advance to some extent, and then the cyclization condensation reaction is subsequently carried out by carrying out the devolatilization step together, thereby completing the reaction.

In carrying out the devolatilization step together throughout the cyclization condensation reaction as described above, the following problem may occur. For example, when heating the polymer at 250° C. or higher by using a twin-screw extruder, partial decomposition or the like occur before a difference in a heat history causes the cyclization condensation reaction, so that the property of the resultant lactone-ring-containing polymer may deteriorate. Thus, before carrying out a cyclization condensation reaction accompanied with the devolatilization step carried out at the same time, a cyclization condensation reaction is promoted in advance to some extent, so that a reaction condition of the latter half can be made milder, thereby preventing deterioration of the property of the resultant lactone-ring-containing polymer. Thus, such arrangement is preferable. It is particularly preferable to start the volatilization step when a certain time passes after initiation of a cyclization condensation reaction, that is, it is particularly preferable to carry out the following operation. The hydroxyl group and ester group in the molecular chain of the polymer obtained at the polymerization step are subjected to a cyclization condensation reaction in advance so as to enhance the cyclization condensation reactivity to some extent, and a cyclization condensation reaction accompanied with the devolatilization step carried out at the same time is subsequently carried out. Specifically, for example, it is preferable that: a cyclization condensation reaction is beforehand promoted in the presence of the solvent by using a kettle reaction vessel so as to have a certain reactivity, and then a reaction vessel equipped with a devolatilization device, e.g., a devolatilization device having a cooling unit and a devolatilization vessel, an extruder with vent, or the like, is used to complete the cyclization condensation reaction. Particularly in this case, it is more preferable that a catalyst for the cyclization condensation reaction exists.

As described above, in obtaining the lactone-ring-containing polymer, it is preferable to adopt the method in which: the hydroxyl group and ester group in the molecular chain of the polymer obtained at the polymerization step are subjected to a cyclization condensation reaction in advance so as to have a certain reactivity, and the resultant is subsequently subjected to a cyclization condensation reaction accompanied with the devolatilization step carried out at the same time. This arrangement makes it possible to further enhance also the cyclization condensation reactivity and to further raise the glass transition temperature, thereby obtaining the lactone-ring-containing polymer having excellent heat resistance. In this case, a standard of the cyclization condensation reactivity is based on dynamic TG measurement shown in Examples, and a rate of weight loss at a temperature between 150 to 300° C. is preferably 2% or less, more preferably 1.5% or less, still more preferably 1% or less.

The reaction vessel usable in carrying out the cyclization condensation reaction before carrying out the cyclization condensation reaction accompanied with the devolatilization step carried out at the same time is not particularly limited, but preferable examples thereof include an autoclave, a kettle reaction vessel, a devolatilization device having a cooling unit and a devolatilization vessel, and a similar reaction vessel, and it is also possible to use an extruder with vent which extruder can be favorably used in the cyclization condensation reaction accompanied with the devolatilization step carried out at the same time. It is more preferable to use an autoclave and a kettle reaction vessel. However, also in case of using a reaction vessel such as the extruder with vent or the like, it is possible to carry out the cyclization condensation reaction under the same condition as a reaction condition of the autoclave or the kettle reaction vessel by making a venting condition milder, by causing the venting operation not to be carried out, or by adjusting a temperature condition, a barrel condition, a screw shape, a screw operation condition, and the like.

In carrying out the cyclization condensation reaction before carrying out the cyclization condensation reaction accompanied with the devolatilization step carried out at the same time, it is preferable to adopt (i) a method in which a catalyst is added to a mixture of the polymer obtained at the polymerization step and the solvent and then the mixture is heated, (ii) a method in which no catalyst is added to the mixture and the mixture is heated, or a method in which the foregoing method (i) or (ii) is carried out under a pressure.

Note that, the "mixture of the polymer and the solvent" introduced into the cyclization condensation reaction at the lactone cyclization condensation step means the following condition: it may be so arranged that a polymerization reaction mixture obtained at the polymerization step is used without any modification, or it may be so arranged that the solvent is removed and another solvent suitable for the cyclization condensation reaction is further added.

The solvent which can be further added in carrying out the cyclization condensation reaction before carrying out a cyclization condensation reaction accompanied with the devolatilization step carried out at the same time is not particularly limited, and examples thereof include: aromatic hydrocarbons such as toluene, xylene, and ethylbenzene; ketons such as methylethylketone, and methylisobutylketone; chloroform; DMSO; and tetrahydrofuran. It is preferable to use the same kind of solvent as the solvent usable in the polymerization step.

Examples of the catalyst added in the method (i) include: an esterification catalyst or an ester exchange catalyst such as generally used p-toluenesulfonic acid; basic compound; organic carboxylate; and carbonate. In the present invention, it is preferable to use the aforementioned organic phosphorous compound.

A timing for adding the catalyst is not particularly limited, and the addition may be carried out at the initial state of the reaction or may be carried out during the reaction or may be carried out at both these timings. An amount of the catalyst added is not particularly limited, but the amount preferably ranges from 0.001 to 5 wt %, more preferably from 0.01 to 2.5 wt %, still more preferably from 0.01 to 0.1 wt %, particularly preferably from 0.05 to 0.5 wt %, with respect to a weight of the polymer. A heating temperature and a heating duration in the method (i) are not particularly limited, but the heating temperature is preferably not lower than a room temperature, more preferably 50° C. or higher, and the heating duration preferably ranges from 1 to 20 hours, more preferably from 2 to 10 hours. When the heating temperature is low or when the heating duration is short, the cyclization condensation reactivity drops, so that such setting is not preferable. Further, when the heating duration is too long, which may result in coloring or decomposition of the resin, so that such setting is not preferable.

Examples of the method (ii) include: a method in which a pressure vessel type reactor or the like is used to heat the polymerization reaction mixture, obtained at the polymerization step, without any modification; and a similar method. The heating temperature is preferably 100° C. or higher, more preferably 150° C. or higher. The heating duration preferably ranges from 1 to 20 hours, more preferably from 2 to 10 hours. When the heating temperature is low or when the heating duration is short, the cyclization condensation reactivity drops, so that such setting is not preferable. Further, when the heating duration is too long, which may result in coloring or decomposition of the resin, so that such setting is not preferable.

Even under a pressure, the methods (i) and (ii) raise no problems under some conditions. Further, even if part of the solvent is naturally evaporated during the reaction in carrying out the cyclization condensation reaction before carrying out the cyclization condensation reaction accompanied with the devolatilization step carried out at the same time, the evaporation raises no problem.

In completion of the cyclization condensation reaction carried out before the cyclization condensation reaction accompanied with the devolatilization step carried out at the same time, that is, right before initiation of the devolatilization step, a rate of weight loss at a temperature between 150 to 300° C. on the basis of the dynamic TG measurement is preferably 2% or less, more preferably 1.5% or less, still more preferably 1% or less. When the rate of weight loss is more than 2%, the cyclization condensation reactivity cannot be sufficiently enhanced even by subsequently carrying out the cyclization condensation reaction accompanied with the devolatilization step carried out at the same time. As a result, the property of the resultant lactone-ring-containing polymer may deteriorate. Note that in carrying out the cyclization condensation reaction, not only the polymer but also other thermoplastic resin may coexist.

In case of carrying out such operation that the hydroxyl group and ester group in the molecular chain of the polymer obtained at the polymerization step are subjected to the cyclization condensation reaction in advance so as to enhance the cyclization condensation reactivity to some extent and a cyclization condensation reaction accompanied with the devolatilization step carried out at the same time is subsequently carried out, the cyclization condensation reaction accompanied with the devolatilization step carried out at the same time may be carried out without separating the polymer obtained at the former cyclization condensation reaction (the polymer obtained by carrying out the cyclization condensation reaction with respect to at least part of the hydroxyl group and ester group in the molecular chain) from the solvent. Further, the cyclization condensation reaction accompanied with the devolatilization step carried out at the same time may be carried out after carrying out other treatment, such as further addition of a solvent after separating the polymer (the polymer obtained by carrying out the cyclization condensation reaction with respect to at least part of the hydroxyl group and ester group in the molecular chain) from the solvent as necessary.

The devolatilization step is not necessarily finished at the same time as the cyclization condensation reaction, but the devolatilization step may be finished when a certain time passes after completion of the cyclization condensation reaction.

A weight average molecular weight of the resultant lactone-ring-containing polymer preferably ranges from 1,000 to 2,000,000, more preferably from 5,000 to 1,000,000, still more preferably from 10,000 to 500,000, particularly preferably from 50,000 to 500,000.

As to the lacton-ring polymer, a rate of weight loss at a temperature between 150 to 300° C. on the basis of the dynamic TG measurement is preferably 1% or less, more preferably 0.5% or less, still more preferably 0.3% or less.

The cyclization condensation reactivity of the lacton-ring polymer is too high, so that it is possible to avoid such disadvantage that bubbles or silver streaks are contained in the formed product. Further, the lactone ring structure is sufficiently introduced into the polymer due to the high cyclization condensation reactivity, so that the resultant lactone-ring-containing polymer has sufficiently high heat resistance.

A coloring degree (YI) of the lactone-ring-containing polymer in 15 wt % of chloroform is preferably not more than 6, more preferably not more than 3, still more preferably not more than 2, most preferably not more than 1. When the coloring degree (YI) exceeds 6, the coloring damages the transparency, so that it may be impossible to use the resultant for the intended purpose.

As to the lactone-ring-containing polymer, on the basis of thermogravimetry (TG), a temperature at which 5% of its weight is lost is preferably 330° C. or higher, more preferably 350° C. or higher, still more preferably 360° C. or higher. The temperature at which 5% of the weight is lost indicates thermal stability on the basis of thermogravimetry (TG). When the temperature is lower than 330° C., it may be impossible to sufficiently exhibit thermal stability.

As to the lactone-ring-containing polymer, its glass transition temperature (Tg) is preferably 115° C. or higher, more preferably 125° C. or higher, still more preferably 130° C. or higher, further still more preferably 135° C. or higher, most preferably 140° C. or higher.

As to the lactone-ring-containing polymer, a total amount of residual volatile matter included therein is preferably 1500 ppm or less, more preferably 1000 ppm or less. When the total amount of the residual volatile matter is more than 1500 ppm, this results in such problem that degeneration or the like at the time of film formation causes the resin to be colored or there occurs an unfavorable film formation condition such as bubbles or silver streaks.

As to the lactone-ring-containing polymer, an entire light transmittance of a formed product obtained by projection molding which transmittance is measured in accordance with ASTM-D-1003 is preferably 85% or more, more preferably 88% or more, still more preferably 90% or more. The entire light transmittance indicates transparency, and when the entire light transmittance is less than 85%, the transmittance drops, so that it may be impossible to use the resultant for the intended purpose.

(II) Organic Fine Particles

The resin composition according to the present embodiment includes the acrylic resin as a main component and organic fine particles.

The organic fine particles exhibit such effect that the flexibility is improved and the retardation is decreased in case where the resin composition is formed into a film.

In order to decrease the retardation in case where the resin composition is formed into a film, it is more preferable that each of the organic fine particles has a structural unit of a vinyl cyanide monomer and a structural unit of an aromatic vinyl monomer. According to the arrangement, the organic fine particles each of which has the structural units are excellent in compatibility with respect to the acrylic resin, so that the organic fine particles can be evenly dispersed in the acrylic resin. Thus, it is possible to improve the bending resistance (flexibility) of the film made of the resin composition. Furthermore, the organic fine particles are less clumped in the acrylic resin, so that it is possible to filtrate the organic fine particles without any clogging of the filter. This makes it possible to provide a resin composition in which foreign substances are less included.

Note that, the structural unit of a vinyl cyanide monomer refers to a polymer structural unit (repeated structural unit) obtained by polymerizing the vinyl cyanide monomer. Likewise, the structural unit of an aromatic vinyl monomer refers to a polymerization structural unit (repeated structural unit) obtained by polymerizing the aromatic vinyl monomer.

The vinyl cyanide monomer is not particularly limited as long as the monomer is a compound having vinyl group and cyano group, and an example thereof is acrylonitrile or the like.

The aromatic vinyl monomer is not particularly limited as long as the monomer is a compound having vinyl group and aromatic group, and an example thereof is styrene or the like.

A specific example of the organic fine particles each of which has the structural unit of the vinyl cyanide monomer and the structural unit of the aromatic vinyl monomer is a compound containing an acrylonitrile-styrene copolymer.

Further, in order to improve the flexibility of the film made of the resin composition, it is more preferable that each of the fine particles has a crosslinked structure.

The organic fine particles each of which has a crosslinked structure can be obtained by polymerizing, for example, a monomer composition containing a polyfunctional compound with two or more non-conjugate double bonds per molecule.

Examples of the polyfunctional compounds include allyl methacrylate, allyl acrylate, dicyclopentenyl methacrylate, dicyclopentenyl acrylate, 1,4-butanediol dimethacrylate, ethyleneglycol dimethacrylate, triallyl cyanurate, triallyl isocyanurate, diallyl phthalate, diallyl malate, divinyl adipate, divinyl benzene ethylene glycol dimethacrylate, divinyl benzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These compounds may be used solely or in a combination of two or more kinds.

Further, the organic fine particles may have a polymerization structural unit (repeated structural unit) obtained by polymerizing at least one kind selected from (meth)acrylic ester, a monomer containing hydroxyl group, unsaturated carboxylic acid, and a monomer represented by General Formula (3), each of which constitutes the aforementioned acrylic resin.

Each of the organic fine particles has the polymer structural unit constituting the acrylic resin, so that dispersibility of the organic fine particles in the resin composition is further improved, thereby further suppressing generation of foreign substances caused by clump of the organic fine particles. This makes it possible to carry out the filtration step at the time of film formation in a short time for example.

In case where the organic fine particles can be obtained by polymerizing the monomer composition containing the polyfunctional compound, the organic fine particles show crosslinked elasticity. This makes it possible to improve the flexibility of the film made of the organic fine particles, thereby obtaining a resin composition which allows formation of a film which has excellent film formability and bending resistance.

Further, in order to evenly disperse the organic fine particles in the resin composition, it is preferable that each of the organic fine particles has a core-shell structure. That is, it is preferable that each of the organic fine particles has, only in its central part (core), a structure derived from the polyfunctional compound, and a part (shell) surrounding the central part has a structure whose compatibility with respect to the acrylic resin constituting the resin composition is high and which decreases the retardation of the film made of the resin composition. This makes it possible to more evenly disperse the organic fine particles in the resin composition, thereby further improving the bending resistance (flexibility) of the film made of the resin composition. Further, the organic fine particles are less likely to be clumped in the acrylic resin, so that it is possible to carry out filtration without any clogging in the filter. This makes it possible to provide a resin composition in which foreign substances are less included.

The organic fine particles each of which has such a core-shell structure can be obtained by carrying out the following operation. For example, a monomer composition containing the polyfunctional compound is polymerized, and then graft polymerization of the vinyl cyanide monomer and the aromatic vinyl monomer is carried out with an unreacted residual reactive functional group (double bond) serving as a graft point, thereby obtaining the organic fine particles. The following describes the shell part and the core part of the core-shell structure.

The shell part is not particularly limited as long as the shell part has the structure whose compatibility with respect to the acrylic resin constituting the resin composition is high and which decreases the retardation of the film made of the resin composition. A specific example thereof is a shell part having the structural unit of a vinyl cyanide monomer and the structural unit of an aromatic vinyl monomer.

The structural unit of a vinyl cyanide monomer (particularly, acrylonitrile) is highly compatible with respect to the lactone-ring-containing polymer. Thus, if the structural unit of a vinyl cyanide monomer is introduced into the shell part, dispersibility of the organic fine particles in the resin is improved. Further, the structural unit of an aromatic vinyl monomer (particularly, styrene) shows a negative retardation property and offsets a positive retardation derived from the lactone ring structure. Further, the aromatic vinyl monomer is highly copolymerizable with acrylonitrile, so that copolymerization with acrylonitrile suppresses the coloring caused by acrylonitrile.

In case where the acrylic resin is the aforementioned lactone-ring-containing polymer, a specific example of the structure of the shell part is a structure obtained by polymerizing a monomer composition made of acrylonitrile (hereinafter, referred to as "AN") and styrene (hereinafter, referred to as "St") (this structure is referred to as "AN/St structure", hereinafter). In this case, a ratio of AN and St preferably ranges from 5:95 to 50:50, more preferably from 10:90 to 40:60. If the ratio is within the foregoing range, the compatibility with respect to the lactone-ring-containing polymer is good, so that the organic fine particles can be evenly dispersed in the lactone-ring-containing polymer.

The structure of the core part is not particularly limited as long as the structure exhibits effect for improving the flexibility of the film made of the resin composition, and an example thereof is a crosslinked structure. Further, it is preferable to adopt a crosslinked rubber structure as the crosslinked structure. Examples of the crosslinked rubber structure include acrylic rubber, polybutadiene rubber, and olefin rubber structures (repeated structural units).

An example of the crosslinked structure is a structure derived from each of the aforementioned polyfunctional compounds. Out of the polyfunctional compounds, it is more preferable to use allyl methacrylate, acrylic allyl, and dicyclopentenyl methacrylate.

An amount of the polyfunctional monomer in forming the core part preferably ranges from 0.01 to 15 wt %, more preferably from 0.1 to 10 wt %, with respect to the monomer composition used in forming the organic fine particles. By setting the amount of the polyfunctional monomer within the foregoing range, it is possible to obtain a film showing favorable bending resistance.

A weight ratio of the core part and the shell part preferably ranges from 20:80 to 80:20, more preferably from 40:60 to 60:40. When the amount of the core part is less than 20 wt %, the bending resistance of the film made of the resin composition is likely to deteriorate. When the amount of the core part exceeds 80 wt %, the hardness and the formability of the film are likely to deteriorate.

An average particle diameter of the organic fine particles preferably ranges from 0.01 to 1 μm, more preferably from 0.03 to 0.5 μm, particularly preferably from 0.05 to 0.3 μm. When the average particle diameter is less than 0.01 μm, it may be impossible to realize sufficient flexibility in the film made of the resin composition. When the average particle diameter exceeds 1 μm, the organic fine particles are likely to be clogged in the filter at the filtration step in producing the film.

A method for producing the organic fine particles is not particularly limited, and it is possible to adopt a conventionally known method such as an emulsion polymerization method, an emulsion-suspension polymerization method, a suspension polymerization method, a clumpy polymerization method, or a solution polymerization method, thereby carrying out single-stage or multistage polymerization of the aforementioned monomer composition. This makes it possible to produce the aforementioned organic fine particles. Above all, it is more preferable to adopt the emulsion polymerization method.

In case of producing the organic fine particles by the emulsion polymerization method, a salting-out or reprecipitation treatment is carried out with respect to a polymerization liquid after the emulsion polymerization so as to clump the organic fine particles, and then filtration and rinse are carried out. After the rinse, the organic fine particles are dried, and the dried organic fine particles are mixed with the acrylic resin, thereby producing the resin composition. Further, it may be so arranged that: after the rinse, the organic fine particles are not dried, and a resultant cake of the organic fine particles is redispersed in an organic solvent such as MIBK (methylisobutylketone), and the acrylic resin is dissolved in the redispersion solvent, or the redispersion solvent and an acrylic resin solution (solution obtained by dissolving the acrylic resin with an organic solvent) are mixed, and then water and/or the organic solvent is devolatized, thereby producing the resin composition.

As the polymerization initiator in polymerizing the organic fine particles, it is possible to use conventionally known initiators such as organic peroxides, inorganic peroxides, and azo compound. Specific examples include: organic peroxides such as t-butylhydroperoxide, 1,1,3,3-tetramethyl butylhydroperoxide, succinic acid peroxide, peroxymaleic acid t-butylester, cumenehydroperoxide, and benzoyl peroxide; inorganic peroxides such as potassium persulfate, and sodium persulfate; fat-soluble initiators such as azobis(2-methylpropionamidine) dihydrochloride, and azobisisobutylonitrile. These initiators may be used solely or may be used in a combination of two or more kinds.

The polymerization initiator may be used as an ordinary redox type initiator obtained by combining with reducer such as sodium sulfite, sodium thiosulfite, sodium formaldehyde sulfoxylate, ascorbic acid, dihydroxy acetone, ferrous sulfate, a complex ferrous sulfate and disodium dihydrogen ethylenediamine tetraacetate.

The organic peroxide can be added by a known addition method, such as (i) a method in which the organic peroxide is added to the polymerization system without any modification, (ii) a method in which the organic peroxide is mixed with the monomer, and (iii) a method in which the organic peroxide is dispersed into an emulsifier aqueous solution. In view of the transparency, it is preferable to adopt the method (ii) in which the organic peroxide is mixed with the monomer or the method (iii) in which the organic peroxide is dispersed into an emulsifier aqueous solution.

In view of the polymerization stability and the control of the particle diameter, it is preferable to use, as the organic peroxide, a redox initiator obtained by combining the organic peroxide with an inorganic reducer such as bivalent iron salt and/or an organic reducer such as sodium formaldehyde sulfoxylate, reducing sugar, and ascorbic acid.

Also the surfactant used for the emulsion polymerization is not particularly limited as long as the surfactant is an ordinary emulsion polymerization surfactant. Specific examples thereof include: anionic surfactants (e.g. sodium alkylsulfonate, sodium alkylbenzene sulfonate, sodium dioctylsulfosuccinate, sodium laurylsulfate, and sodium salts of fatty acid) and non-ionic surfactants (e.g. reaction products from alkyl phenol/aliphatic alcohol and propylene oxide/ethylene oxide). These surfactants may be used solely or may be used in a combination of two or more kinds. An alkyl amine salt or like cationic surfactant may also be used where necessary.

The resultant latex of the organic fine particles can be separated and collected by ordinary treatments such as coagulation, rinse, and drying, or by treatments such as spray drying and freeze drying.

A single kind of the aforementioned organic fine particles may be included in the resin composition or two or more kinds of the organic fine particles may be included in the resin composition. Further, in addition to the aforementioned organic fine particles, for example, organic fine particles giving only the flexibility (hereinafter, the organic fine particles are referred to as "flexibilizing organic fine particles") may be further included in the resin composition. This makes it possible to adjust a ratio of (i) organic fine particles having the effect for decreasing the retardation and (ii) organic fine particles which do not have the effect for decreasing the retardation (e.g., the flexibilizing organic fine particles) in the resin composition, thereby adjusting the retardation of the film made of the resin composition to be a desired value.

An example of the flexibilizing organic fine particles is organic fine particles obtained by polymerizing the monomer composition containing the polyfunctional compound, and it is more preferable that the organic fine particles further contain a polymer structural unit (repeated structural unit) obtained by polymerizing at least one kind selected from (meth)acrylic acid ester, a monomer containing hydroxyl group, unsaturated carboxylic acid, and a monomer represented by General Formula (3), each of which constitutes the aforementioned acrylic resin.

Further, an example of the flexibilizing organic fine particles is organic fine particles having the aforementioned core/shell structure in which the shell part does not have a retardation decreasing structure (e.g., the structural unit of a vinyl cyanide monomer and the structural unit of an aromatic vinyl monomer).

Examples of the structure of the shell part which has no retardation decreasing structure includes, if the acrylic resin is the lactone ring-containing polymer, a structure obtained by polymerization of a monomer composition of methyl 2-(hydroxymethyl)acrylate (hereinafter, "RHMA") and methylmethacrylate (hereinafter, "MMA") (hereinafter, "RHMA/MMA structure"), a structure obtained by polymerization of a monomer composition of cyclohexylmethacrylate (hereinafter, "CHMA") and MMA (hereinafter, "CHMA/MMA structure"), a structure obtained by polymerization of a monomer composition of benzylmethacrylate (hereinafter, "BzMA") and MMA (hereinafter, "BzMA/MMA structure"), and a structure obtained by polymerization of a monomer composition of 2-hydroxyethylmethacrylate (hereinafter, "HEMA") and MMA (hereinafter, "HEMA/MMA structure").

In case where the structure of the shell part is the RHMA/MMA structure, a ratio of RHMA and MMA preferably ranges from 5:95 to 50:50, more preferably from 10:90 to 40:60. Within the foregoing range, the compatibility with respect to the lactone-ring-containing polymer is good, and the organic fine particles can be evenly dispersed into the lactone-ring-containing polymer. Further, in case where the shell has the RHMA/MMA structure, it is preferable that the lactone ring structure is included. The lactone ring structure can be introduced by forming the shell and lactonizing the formed shell.

In case where the structure of the shell part is the CHMA/MMA structure, a ratio of CHMA and MMA preferably ranges from 5:95 to 50:50, more preferably from 10:90 to 40:60. Within the foregoing range, the compatibility with respect to the lactone-ring-containing polymer is good, and the organic fine particles can be evenly dispersed into the lactone-ring-containing polymer.

In case where the structure of the shell part is the BzMA/MMA structure, a ratio of BzMA and MMA preferably ranges from 10:90 to 60:40, more preferably from 20:80 to 50:50. Within the foregoing range, the compatibility with respect to the lactone-ring-containing polymer is good, and the organic fine particles can be evenly dispersed into the lactone-ring-containing polymer.

In case where the structure of the shell part is the HEMA/MMA structure, a ratio of HEMA and MMA preferably ranges from 2:98 to 50:50, more preferably from 5:95 to 40:60. Within the foregoing range, the compatibility with respect to the lactone-ring-containing polymer is good, and the organic fine particles can be evenly dispersed into the lactone-ring-containing polymer.

The core part of the flexibilizing organic fine particles is arranged in the same manner as that of the aforementioned core part of the organic fine particles for example.

(III) Resin Composition

The resin composition according to the present embodiment contains the aforementioned acrylic resin and the aforementioned organic fine particles.

An amount of the acrylic resin included in the resin composition preferably ranges from 50 wt % to 95 wt %, more preferably from 65 wt % to 95 wt %. When the amount of the acrylic resin is less than 50 wt %, the heat resistance and the optical property of the film made of the resin composition are likely to deteriorate.

An amount of the organic fine particles included in the resin composition preferably ranges from 5 wt % to 50 wt %, more preferably from 10 wt % to 30 wt %. When the amount of the organic fine particles is less than 5 wt %, sufficient flexibility is less likely to be obtained in case where a film is made of the resin composition.

The organic fine particles and the acrylic resin are mixed with each other as follows. For example, a conventionally known mixer such as an omnimixer is used to preblend the organic fine particles with the acrylic resin, and then the resultant mixture is extruded and kneaded. In this case, the mixer used in the extrusion and kneading is not particularly limited, and examples thereof include conventionally known mixers, e.g., an extruder such as single-screw extruder and twin-screw extruder, and a pressure kneader.

In mixing the organic fine particles with the acrylic resin, it is more preferable to separately produce a master butch in which the organic fine particles are contained in the acrylic resin with a high concentration and to dilute the master butch with the acrylic resin so as to produce the resin composition, thereby evenly dispersing the organic fine particles into the acrylic resin.

The resin composition in accordance with the present embodiment may contain various additives. Examples of such additives include hindered phenol-, phosphorous-, and sulfur-based oxidation inhibitors; stable agents, such as light resistant agents, whetherproof agents, and thermostable agents; reinforcement materials, such as glass and carbon fibers; ultraviolet absorption agents, such as phenyl salicylate, (2,2'-hydroxy-5-methylphenyl)benzotriazole, and 2-hydroxybenzophenone; near-infrared absorption agents; fire retardants, such as tris(dibromopropyl) phosphate, triallyl phosphate, and antimony oxide; charge inhibitors, such as anionic, cationic, and non-ionic surfactants; coloring agents, such as inorganic pigments, organic pigments, and dyes; organic and inorganic fillers; resin modification agents; organic and inorganic charge agents; plastic agents; lubricants; charge inhibitors; and fire retardants.

An amount of the additive included in the resin composition preferably ranges from 0 to 5 wt %, more preferably from 0 to 2 wt %, still more preferably from 0 to 0.5 wt %.

On the assumption that the film made of the resin composition according to the present embodiment has the thickness of 100 μm, it is preferable that no crack occurs in bending the film in an atmosphere of 25° C. and 65% RH (relative humidity) so that the bending angle is 180° with a bending radius of 1 mm. Herein, the bending radius means a distance from a center of the bending line of the film to an outermost end of the resultant crook of the film. If the film which includes the acrylic resin as a main component has no crack when the film is bent so that the bending angle is 180° with the bending radius of 1 mm, it is extremely easy to handle the film and the film is industrially useful. If the film which includes the acrylic resin as a main component has a crack when the film is bent so that the bending angle is 180° with the bending radius of 1 mm, its flexibility is insufficient and it is difficult to handle the film. Note that, the bending test is carried out in accordance with JIS. For example, it is preferable to carry out the bending test in accordance with K5600-5-1 (1999). A shape of the crack is not particularly limited and has a length of 1 mm or more for example.

On the assumption that the film made of the resin composition according to the present embodiment has the thickness of 100 μm, it is preferable that the resultant crook is not partially or entirely separated (cracked) from the bending line in bending the film in an atmosphere of 25° C. and 65% RH so that the bending angle is 180° with a bending radius of 1 mm. In this case, a slight crack which does not results in complete separation from the bending line may occur, but it is more preferable that the slight crack does not occur.

In case where the resin composition according to the present embodiment is formed into the film, its in-plane retardation is preferably 10 nm or less, more preferably 5 nm or less, so as to correspond to each thickness of 100 μm. Further, also its in-plane retardation after uniaxially stretching the film 1.5 times in its original length is preferably 10 nm or less, more preferably 5 nm or less, so as to correspond to each thickness of 100 μm. Generally, if the film is stretched, its flexibility is improved, but anisotropy of its refraction increases, which results in increase of the retardation. A film having such a large retardation cannot be used for the purpose which requires a low refraction. In contrast, the film made of the resin composition according to the present embodiment contains the aforementioned organic fine particles, so that the retardation less increases even in case where the film is stretched.

In case where the resin composition according to the present embodiment is formed into the film, its haze is preferably 5% or less, more preferably 3% or less, still more preferably 1% or less.

As to the resin composition obtained in this manner, its glass transition temperature ranges from 120 to 200° C., and a retardation of the film made of the resin composition is 10 nm or less in its plane direction so as to correspond to each 100 μm thickness, and when a film is made of the resin composition so as to have 100 μm thickness, the film has no crack in bending the film in atmosphere of 25° C. and 65% RH so that a bending angle is 180° with a bending radius of 1 mm.

Further, it is preferable that the organic fine particles and the acrylic resin are mixed with each other and then the acrylic resin in which the organic fine particles are dispersed are filtrated by a polymer filter. By carrying out the filtration by the polymer filter, it is possible to obtain the resin composition in which foreign substances are less included.

As the specific number of foreign substances in the film made of the resin composition, it is preferable that the number of foreign substances whose particle diameter is 20 μm or more is $1000/m^2$ or less, and it is more preferable that the number of foreign substances whose particle diameter is 20 μm or more is $500/m^2$ or less, it is still more preferable that the number of foreign substances whose particle diameter is 20 μm or more is $200/m^2$ or less, and it is ideal that the number of foreign substances whose particle diameter is 20 μm or more is $0/m^2$ or less.

As to the polymer filter, its filtration accuracy preferably ranges from 1 μm to 20 μm, more preferably from 1 μm to 10 μm, still more preferably from 1 μm to 5 μm. When the filtration accuracy is less than 1 μm, a filtration retention duration is longer, which results in drop of the productivity. Thus, such arrangement is not preferable. Further, when the filtration retention duration is longer, the acrylic resin is likely to be thermally deteriorated, which may result in increase of foreign substances. When the filtration accuracy exceeds 20 μm, foreign substances are likely to be incorporated. Thus, such arrangement is not preferable.

Further, the polymer filter is not particularly limited as long as the polymer filter has the filtration accuracy within the foregoing range, and it is possible to use a conventionally known polymer filter. Examples of the polymer filter include a leaf disk type polymer filter, a pack disk filter, a cylindrical filter, a candle-shaped filter, and the like. Above all, it is more preferable to use the leaf disk type polymer filter since its filtration area size is large and this results in less pressure loss in case where a high viscosity resin is filtrated.

In case where the polymer filter is the leaf disk type polymer filter, examples of the filter include: a filter made of a material obtained by sintering a metal fiber nonwoven cloth; a filter made of a material obtained by sintering metal powder; a filter made of laminated metal gauzes; and the like. Above all, it is more preferable to use the filter made of a material obtained by sintering a metal fiber nonwoven cloth.

A filtration area size corresponding to an amount of resin (resin composition) treated by the polymer filter per hour is suitably set in accordance with the amount of resin to be treated, so that the filtration area size is not particularly limited. For example, the filtration area size can be set to 0.001 to 0.15 $m^2/(kg/h)$.

In the filtration by the polymer filter, a temperature of the acrylic resin in which the organic fine particles are dispersed is preferably 260° C. or higher, more preferably 270° C. or higher. Further, the temperature is preferably 310° C. or lower, more preferably 300° C. or lower, still more preferably 290° C. or lower.

A viscosity (in case of measurement at a shear rate of 100/s) of the acrylic resin in which the organic fine particles are dispersed at the time of the filtration carried out with the polymer filter is preferably 500 Pa·s or less, more preferably 450 Pa·s or less, still more preferably 400 Pa·s or less.

A retention duration of the resin composition in the filtration carried out with the polymer filter is preferably 20 minutes or shorter, more preferably 10 minutes or shorter, still more preferably 5 minutes or shorter. Further, an inlet pressure of the filter in the filtration carried out with the polymer filter can be set within a range from 3 to 15 MPa for example, and an outlet pressure of the filter can be set within a range from 0.3 to 10 MPa for example. Further, a pressure loss of the filter is preferably within a range from 1 to 15 MPa. When the pressure loss is less than 1 MPa, the resin (resin composition) is likely to pass through the polymer filter unevenly in view of its flow path, and quality of the resin composition having been filtrated is likely to deteriorate. On the other hand, when the pressure loss exceeds 15 MPa, the filter is likely to be broken.

The resin composition according to the present embodiment has not only excellent transparency and heat resistance but also desired properties such as a less coloring property, a mechanical strength, and a film formation processability. Particularly, the resin composition is a low birefringent material having high optical isotropy, so that the resin composition is useful for an optical lens, an optical prism, an optical film, an optical fiber, an optical disk, and the like. Above all, the resin composition can be favorably used for the optical lens, the optical prism, and the optical film.

The resin composition according to the preset embodiment can be formed into various shapes in accordance with a purpose of use. Examples of the shape into which the resin composition can be formed include a film, a sheet, a plate, a disk, a block, a ball, a lens, a rod, a strand, a cord, a fiber, and the like. As the formation method, a method is suitably selected from conventionally known methods in accordance with the shape of the resin composition, and the method is not particularly limited.

(IV) Film

The film according to the present embodiment can be obtained from the resin composition according to the present embodiment. Note that, it may be so arranged that the resin composition is retrieved and then the film is produced by the below-described formation method, or it may be so arranged that the film is continuously produced by the below-described method without retrieving the resin composition after mixing the acrylic resin and the organic fine particles with each other.

Further, the filtration which can be carried out with the polymer filter in producing the resin composition may be carried out in forming the resin composition into a film.

Examples of the method for forming the resin composition into a film include conventionally known film molding methods such as solution casting (solution flow casting), melting extrusion, calendaring, and compression formation. Out of these film formation methods, it is particularly preferable to adopt the solution casting (solution flow casting) and the melting extrusion.

Examples of a solvent used in the solution casting (solution flow casting) include: aromatic hydrocarbons, such as benzene, toluene, and xylene; aliphatic hydrocarbons, such as cyclohexane and decalin; esters, such as ethyl acetate and butyl acetate; ketones, such as acetone, methylethyl ketone, and methylisobutyl ketone; alcohols, such as methanol, ethanol, isopropanol, butanol, isobutanol, ethyleneglycol monomethylether, ethyleneglycol monoethylether, and ethyleneglycol monobutylether; ethers, such as tetrahydrofuran and dioxane; halogenated hydrocarbons, such as dichloromethane, chloroform, and carbon tetrachloride; dimethylformamide; and dimethyl sulfoxide. These solvents may be used solely or may be used in a combination of two or more kinds.

Examples of a device for carrying out the solution casting (solution flow casting) include a drum casting machine, a band casting machine, a spin coater, and the like.

Examples of the melting extrusion include a T die process, an inflation process, and the like. A formation temperature at this time is suitably adjusted in accordance with a glass transition temperature of a raw material for the film and is not particularly limited. However, for example, the formation temperature preferably ranges from 150 to 350° C., more preferably from 200 to 300° C.

In case of forming the resin composition into a film by the T die process, a T die is provided on an end portion of a known single-screw extruder or twin-screw extruder, and the resin composition extruded in a film manner is wound, thereby obtaining a film in a roll manner. At this time, a temperature of the wound roll is suitably adjusted and the film is stretched in an extruding direction, so that the film can be uniaxially stretched. Further, the film is stretched in a direction perpendicular to the extruding direction, so that simultaneous biaxial stretch and successive biaxial stretch can be carried out.

The film according to the present embodiment may be an unstretched film or may be a stretched film. In case of the stretched film. The film may be a uniaxially stretched film or may be a biaxially stretched film. In case of the biaxially stretched film, the film may be a simultaneous biaxially stretched film or may be a successive biaxially stretched film. In case of biaxially stretching the film, the mechanical strength is improved, and the film performance is improved. With the film arranged in this manner, it is possible to suppress increase of the retardation even when the film is stretched, and it is possible to keep the optical isotropy.

A stretching temperature is preferably in a vicinity of a glass transition temperature of the acrylic resin which is a raw material for the film. Specifically, the stretching temperature preferably ranges from (glass transition temperature −30° C.) to (glass transition temperature +100° C.), more preferably from (glass transition temperature −20° C.) to (glass transition temperature +80° C.). When the stretching temperature is lower than (glass transition temperature −30° C.), it may be impossible to obtain a sufficient stretch scale factor. On the other hand, when the stretching temperature exceeds (glass transition temperature +100° C.), the acrylic resin flows, so that it may be impossible to stably stretch the film.

The stretch scale factor defined by an area ratio preferably ranges from 1.1 to 25, more preferably from 1.3 to 10. When the stretch scale factor is less than 1.1, it may be impossible to improve durability required in the stretching. On the other hand, when the stretch scale factor exceeds 25, it may be impossible to exhibit effect corresponding to the raised stretch scale factor.

A stretching rate preferably ranges from 10 to 20,000%/min, more preferably from 100 to 10,000%/min, in a single direction. When the stretching rate is less than 10%/min, it takes some time to obtain the sufficient stretch scale factor, so that the production cost increases. On the other hand, when the stretch scale factor exceeds 20,000%/min, the stretched film may be broken.

Note that, with respect to the film according to the present embodiment, it is possible to carry out a heat treatment (annealing) after carrying out the stretching treatment in order to stabilize its optical isotropy and mechanical strength. A condition for the heat treatment is suitably selected as in a condition for a heat treatment carried out with respect to a conventionally known stretched film and is not particularly limited.

The thickness of the film according to the present embodiment preferably ranges from 5 to 200 μm, more preferably from 10 to 100 μm. When the thickness is less than 5 μm, the strength of the film drops. Besides, in case where the film is applied to other component and a durability test is carried out with respect to the resultant, the thickness less than 5 μm is likely to cause the resultant to be greatly crimped. On the other hand, when the thickness exceeds 200 μm, the transparency of the film drops and the moisture permeability decreases. Besides, in case where an aqueous adhesive is used in applying the film to other component, it may take some time to dry water serving as a solvent of the adhesive.

As to the film according to the present embodiment, its surface wetting tension is preferably 40 mN/m or more, more preferably 50 mN/m or more, still more preferably 55 mN/m or more. When the surface wetting tension is at least 40 mN/m or more than 40 mN/m, it is possible to keep the film so tightly bonded to other component. In order to adjust the surface wetting tension, it is possible to carry out a corona discharge treatment, spray of ozone, irradiation of ultraviolet ray, a flame treatment, a chemical treatment, and other conventionally known surface treatment.

The film according to the present embodiment may include various kinds of additives. Examples of the additives include: hindered phenol-, phosphorous-, and sulfur-based oxidation inhibitors; stable agents, such as light resistant agents, wetherproof agents, and thermostable agents; reinforcement materials, such as glass and carbon fibers; ultraviolet absorption agents, such as phenyl salicylate, (2,2'-hydroxy-5-methylphenyl)benzotriazole, and 2-hydroxybenzophenone; near-infrared absorption agents; fire retardants, such as tris(dibromopropyl) phosphate, triallyl phosphate, and antimony oxide; charge inhibitors, such as anionic, cationic, and nonionic surfactants; coloring agents, such as inorganic pigments, organic pigments, and dyes; organic and inorganic fillers; resin modification agents; organic and inorganic charge agents; plastic agents; lubricants; charge inhibitors; and fire retardants.

An amount of the additives contained in the film preferably ranges from 0 to 5 wt %, more preferably from 0 to 2 wt %, even more preferably from 0 to 0.5 wt %.

As described above, a resin composition according to the present invention comprises: an acrylic resin as a main component; and organic fine particles whose average particle diameter ranges from 0.01 μm to 1 μm, wherein a glass transition temperature of the acrylic resin ranges from 110° C. to 200° C., and the organic fine particles have a structural unit of a vinyl cyanide monomer and a structural unit of an aromatic vinyl monomer.

Thus, it is possible to provide a resin composition enabling formation of a film which has excellent film formability and bending resistance and whose retardation is small.

Further, a film according to the present invention includes the resin composition according to the present invention.

Thus, it is possible to provide a film which has excellent film formability and bending resistance and whose retardation is small.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

EXAMPLES

The following Examples and Comparative Examples will further detail the present invention, but the present invention is not limited to the Examples. In the following description, the term "parts by weight" is sometimes referred to merely as "parts" for convenience in description.

Note that, for convenience in description, the following abbreviated terms are used in Examples.

MMA: methylmethacrylate
RHMA: methyl 2-(hydroxymethyl)acrylate
SFS: sodium formaldehyde sulfoxylate
EDTA: disodium dihydrogen ethylene diamine tetraacetate
BA: n-butyl acrylate
St: styrene
AN: acrylonitrile
BDMA: 1,4-butanediol dimethacrylate
AMA: allyl methacrylate
PBH: t-butylhydroperoxide
CHP: cumene hydroperoxide
TDM: tertiary dodecyl mercaptan <Weight Average Molecular Weight>

A weight average molecular weight of the acrylic resin was calculated by GPC (GPC system produced by TOSOH CORPORATION, in terms of polystyrene, developing solvent: chloroform).

<Glass Transition Temperature>

Thermal analysis of the acrylic resin, the resin composition, and the film was carried out under such condition that an amount of each sample was about 10 mg, a rate of rising temperature was 10° C./min, and a nitrogen flow was 50 cc/min, by using DSC (product of Rigaku Corporation: product name is DSC-8230). Note that, the glass transition temperature (Tg) was calculated by midpoint calculation in accordance with ASTM-D-3418.

<Dynamic TG>

A polymer (or a polymer solution or pellet) was dissolved or diluted in tetrahydrofuran, and the resultant was poured into excessive hexane or methanol and reprecipitation was carried out, and the resultant precipitate was retrieved and dried in a vacuum manner (1 mmHg (1.33 hPa), 80° C., 3 hours or longer) so as to remove a volatile matter or the like, and the resultant white solid resin was analyzed by the following method (dynamic TG).

Measuring device: Thermo Plus 2 TG-8120 Dynamic TG (product of Rigaku Corporation)
Measurement condition: 5 to 10 mg of sample
Rate of rising temperature: 10° C./min
Atmosphere: Nitrogen flow 200 ml/min
Method: Step-by-step isothermal control (a weight loss rate at a temperature between 60° C. and 500° C. was controlled so as to be 0.005%/sec or less)<

<Average Particle Diameter>

An average particle diameter of the organic fine particles was measured by using a particle diameter distribution measuring device (product of NICOMP: Submicron Particle Sizer NICOMP 380).

<Number of Foreign Substances>

Five films each of which had a size of 5 cm×20 cm and had the thickness of 100 μm were observed with eyes and the number of foreign substances each of which had a particle diameter was 20 μm or more were averaged. Note that, the particle diameter of each foreign substance was measured by using an optical microscope.

<Flexibility>

The flexibility (bending resistance) of the film was evaluated in atmosphere of 25° C. and 65% RH by bending the film whose thickness was 100 μm at a bending angle of 180° with a bending radius of 1 min. Under this condition, a state in which no crack occurred is indicated by "○", a state in which a crack occurred depending on a bending direction is indicated by "Δ", and a state in which a crack occurred is indicated by "X". Note that, when the film was uniaxially stretched, both tests in the uniaxially stretching direction and in a direction perpendicular to the uniaxially stretching direction were respectively carried out.

<Cutter Cutting Property>

The cutter cutting property of the film was evaluated in atmosphere of 25° C. and 65% RH by cutting the film whose thickness was 100 μm with a cutter. Under this condition, a state in which the film was cut without occurrence of any crack at the cut portion is indicated by "◯", a state in which a crack occurred is indicated by "X", and a state in which a crack occurred depending on a cutting direction is indicated by "Δ". Note that, when the film was uniaxially stretched, both tests in the uniaxially stretching direction and in a direction perpendicular to the uniaxially stretching direction were respectively carried out.

<Haze>

The haze of the film whose thickness was 100 μm was measured by using NDH-1001DP produced by NIPPON DENSHOKU.

<Refraction Anisotropy>

The refraction anisotropy (retardation: Re) was measured by using KOBRA-WR produced by Oji Scientific Instruments.

<Dispersibility>

A cut piece of the film was wrapped with an epoxy resin, and then the epoxy resin was cured, and the cured epoxy resin was sliced with a microtome, thereby producing a sample to be observed. The resultant sample was observed with a scanning electron microscope (FE-SEM S-4800: product of Hitachi High-Technologies Corporation), and dispersibility of the organic fine particles in the thermoplastic resin was observed on the basis of the resultant transmitted electron image indicative of a cross section of the film.

<Ratio of Lactone Ring Structural Unit>

The ratio of the lactone ring structural unit was calculated as follows.

First, on the basis of weight loss caused by dealcoholization of all hydroxyl groups as methanol from the polymer composition obtained by polymerization, a dealcoholization reactivity was calculated in accordance with weight loss caused by dealcoholization reaction at a temperature between 150° C. which corresponds to a state just before initiation of the weight loss in the dynamic TG measurement and 300° C. which corresponds to a state just before initiation of decomposition of the polymer in the dynamic TG measurement.

Here, a ratio of weight loss at a temperature between 150° C. and 300° C. in the dynamic TG measurement of the polymer having the lactone ring structure was measured, and the actually measured ratio of the weight loss was defined as "X". While, a theoretical weight loss on such assumption that all hydroxyl groups are dealcoholized from the composition of the polymer (that is, weight loss calculated on such assumption that there occurs 100% dealcoholization which can occur in the composition of the polymer) is defined as (Y).

Note that, the theoretical weight loss (Y) is, more specifically, can be calculated in accordance with a molar ratio of a raw material monomer having a structure (hydroxyl group) associated with the dealcoholization in the polymer, that is, in accordance with a ratio of the raw material monomer included in the polymer composition.

Further, the dealcoholization reactivity can be calculated in accordance with the following expression Dealcoholization reactivity=(1−(actually measured weight loss(X)/theoretical weight loss(Y)).

As an example, a ratio of a lactone ring structure in an acrylic resin (A-1) obtained in below-described Production Example 1 was calculated. A molecular weight of methanol was 32, and a molecular weight of methyl 2-(hydroxymethyl)acrylate was 116, and a ratio (weight ratio) of methyl 2-(hydroxymethyl)acrylate in the polymer was 20 wt % in view of the composition, so that a theoretical weight loss (Y) of the acrylic resin (A-1) was calculated as (32/116)×20≈5.52 wt %.

On the other hand, an actually measured weight loss of the acrylic resin (A-1) in accordance with the dynamic TG measurement was 0.18 wt %. If these values are applied to the expression of the dealcoholization, (1−(0.18/5.52))≈0.967, and its dealcoholization was 96.7%.

Further, on such assumption that lactone cyclization reaction was carried out so as to correspond to the dealcoholization reaction, the ratio of lactone ring was calculated in accordance with the following expression Ratio of lactone ring(wt %)=B×A×$M_R$/$M_m$ where B represents a weight ratio of a raw material having a structure (hydroxyl group) associated with lactone cyclization in a monomer composition used in the copolymerization, $M_R$ represents a formula weight of a generated lactone ring structural unit, $M_m$ represents a molecular weight of a raw material monomer having a structure (hydroxyl group) associated with lactone cyclization, and A represents alcohol reactivity.

In case of Production Example 1 for example, a ratio of methyl 2-(hydroxymethyl)acrylate in the acrylic resin (A-1) was 20.0 wt %, a calculated dealcoholization reactivity was 96.7%, and a formula weight of a lactone ring structure generated when methyl 2-(hydroxymethyl)acrylate having a molecular weight of 116 was condensed with methyl methacrylate was 170, so that the ratio of the lactone ring in the acrylic resin (A-1) was 28.3 (=20.0×0.967×170/116) wt %.

Production Example 1

Production of Acrylic Resin 10 parts of RHMA, 40 parts of MMA, and 50 parts of toluene were placed in a 30 L reaction vessel equipped with a stirring device, a temperature sensor, a cooling pipe, and a nitrogen inlet. A temperature thereof was raised while passing nitrogen. At 105° C., 0.05 parts of tertiary butyl peroxy isopropyl carbonate was added as an initiator, and at the same time, a solution containing 0.1 part of tertiary butyl peroxy isopropyl carbonate and 0.9 parts of toluene was dropped for two hours, and solution polymerization was carried out in circulation (100 to 115° C.). After completion of the dropping, the resultant was left in circulation (100 to 115° C.) for four hours, thereby obtaining a polymer solution.

0.05 parts of a mixture of stearyl phosphate and distearyl phosphate (product of Sakai Chemical Industry Co., Ltd.) was added to 100 parts of the polymer solution, and a cyclization condensation reaction thereof was carried out in circulation (95 to 100° C.) for five hours while passing nitrogen. Subsequently, the polymer solution having been subjected to the cyclization condensation reaction was introduced into a vent type screw twin-screw extruder (diameter=29.75 mm, L/D=30) having a barrel temperature of 250° C., a rotational frequency of 100 rpm, a decompression degree of 13.3 to 400 hPa, a single rear vent and four fore vents, with a processing rate of 2.0 kg/hour in terms of an amount of resin. Further cyclization condensation reaction and devolatilization were carried out in the extruder, and the resultant was extruded from the extruder, thereby obtaining a pellet of transparent acrylic resin (A-1). A weight average molecular weight of the acrylic resin (A-1) was 139,000, and a glass transition temperature of the acrylic resin (A-1) was 135° C.

Production Example 2

Production 1 of Organic Fine Particles 710 parts of deionized water and 1.5 parts of sodium lauryl sulfate were placed in a polymerization container equipped with a cooler and stirring device so that sodium lauryl sulfate was dissolved, and an internal temperature was raised to 70° C. Further, a mixture solution obtained by mixing 0.93 parts of SFS, 0.001 part of ferrous sulfate, 0.003 parts of EDTA, and 20 parts of deionized water was poured into the polymerization container in a single dose, and an air in the polymerization container was sufficiently replaced with a nitrogen gas.

A monomer mixture solution (M-1) (7.10 parts of BA, 2.86 parts of St, 0.02 parts of BDMA, and 0.02 parts of AMA) and a polymerization initiator solution (0.13 parts of PBH and 10.0 parts of deionized water) was poured into the polymerization container in a single dose, and a polymerization reaction was carried out for 60 minutes.

Subsequently, polymerization was carried out while separately dropping a monomer mixture solution (M-2) (63.90 parts of BA, 25.20 parts of St, and 0.9 parts of AMA) and a polymerization initiator solution (0.246 parts of PBH and 20.0 parts of deionized water) for 90 minutes in a successive manner. After completion of the dropping, the polymerization was further continued for 60 minutes. In this manner, a part serving as a core of a core/shell structure of the organic fine particles was obtained.

Subsequently, polymerization was carried out while separately dropping a monomer mixture solution (M-3) (73.0 parts of St and 27.0 parts of AN) and a polymerization initiator solution (0.27 parts of PBH and 20.0 parts of deionized water) for 100 minutes in a successive manner, and an internal temperature was raised to 80° C. after completion of the dropping, and the polymerization was further continued for 120 minutes. Next, the resultant was cooled down so that the internal temperature was 40° C., and then the resultant was made to pass through a 300-mesh metal gauze, thereby obtaining an emulsion polymerization liquid of organic fine particles.

The resultant emulsion polymerization liquid of organic fine particles was salted out with calcium chloride, coagulated, rinsed with water, and dried, thereby obtaining powdery organic fine particles (B-1, average particle diameter was 0.105 μm).

Production Example 3

Production 2 of Organic Fine Particles 710 parts of deionized water and 1.5 parts of sodium lauryl sulfate were placed in a polymerization container equipped with a cooler and a stirring device so that sodium lauryl sulfate was dissolved, and an internal temperature was raised to 50° C. Further, a mixture solution obtained by mixing 0.93 parts of SFS, 0.001 part of ferrous sulfate, 0.003 parts of EDTA, and 20 parts of deionized water into the polymerization container in a single dose, and an air in the polymerization container was sufficiently replaced with a nitrogen gas.

A monomer mixture solution (M-1) (35.50 parts of BA, 14.00 parts of St, and 0.5 parts of AMA) and a polymerization initiator solution (0.13 parts of PBH and 10.0 parts of deionized water) was poured into the polymerization container in a single dose, and a polymerization reaction was carried out for 60 minutes.

Subsequently, polymerization was carried out while separately dropping a monomer mixture solution (M-2) (35.50 parts of BA, 14.00 parts of St, and 0.5 parts of AMA) and a polymerization initiator solution (0.246 parts of PBH and 20.0 parts of deionized water) for 90 minutes in a successive manner. After completion of the dropping, the polymerization was further continued for 60 minutes. In this manner, a part serving as a core of a core/shell structure of the organic fine particles was obtained.

Subsequently, polymerization was carried out while separately dropping a monomer mixture solution (M-3) (73.0 parts of St and 27.0 parts of AN) and a polymerization initiator solution (0.27 parts of PBH and 20.0 parts of deionized water) for 100 minutes in a successive manner, and an internal temperature was raised to 80° C. after completion of the dropping, and the polymerization was further continued for 120 minutes. Next, the resultant was cooled down so that the internal temperature was 40° C., and then the resultant was made to pass through a 300-mesh metal gauze, thereby obtaining an emulsion polymerization liquid of organic fine particles.

The resultant emulsion polymerization liquid of organic fine particles was salted out with calcium chloride, coagulated, rinsed with water, and dried, thereby obtaining powdery organic fine particles (B-2, average particle diameter was 0.220 μm).

Production Example 4

Production 3 of Organic Fine Particles 550 parts of deionized water and 37.5 parts of 2 wt % sodium dioctyl sulfosuccinate aqueous solution were placed in a polymerization container equipped with a cooler and a stirring device, and an internal temperature was raised to 60° C., and an air in the polymerization container was sufficiently replaced with a nitrogen gas. Further, a mixture solution obtained by mixing 0.45 parts of SFS, 0.00075 parts of ferrous sulfate, 0.003 parts of EDTA, and 12 parts of deionized water into the polymerization container in a single dose, and the air in the polymerization container was sufficiently replaced with a nitrogen gas again.

A monomer mixture solution (M-1) (132 parts of BA, 14.7 parts of MMA, 2.93 parts of AMA, and 0.293 parts of CHP) was dropped at 60° C. for five hours, and polymerization reaction was further carried out for 30 minutes after the dropping.

Subsequently, 7.5 parts of 2 wt % sodium dioctyl sulfosuccinate aqueous solution and 5 parts of deionized water were added, and then polymerization was carried out while dropping a monomer mixture solution (M-2) (120.0 parts of MMA, 30.0 parts of St, 0.45 parts of TDM, and 0.45 parts of CHP) for five hours. After completion of the dropping, the polymerization was further continued for two hours. Further, the resultant was cooled down so that the internal temperature was 25° C., and then the resultant was made to pass through a 300-mesh metal gauze, thereby obtaining an emulsion polymerization liquid of organic fine particles (average particle diameter was 0.119 μm).

The resultant emulsion polymerization liquid of organic fine particles was salted out with calcium chloride, coagulated, rinsed with water, and dried, thereby obtaining powdery organic fine particles (B-3).

Example 1

The acrylic resin (A-1) obtained in Production Example 1 and the organic fine particles (B-1) obtained in Production Example 2 were kneaded by a twin-screw extruder (cylinder diameter: 20 mm) at 260° C. while being fed by a feeder at such a weight ratio that acrylic resin (A-1)/organic fine particles (B-1)=80/20, and the kneaded resultant was filtrated with a leaf disk-type polymer filter (Nagase & Company, Ltd., filtration accuracy was 5 μm), thereby obtaining a pellet. Further, a single-screw extruder was used to melt-extrude the resultant from a coat hanger T die (width: 150 mm), thereby forming a film (C-1) whose thickness was 100 μm (unstretched film). Further, the film (C-1) was uniaxially stretched 1.5 times (at 140° C. for 30 seconds) with an autograph (AGS-100D produced by Shimazu Corporation), thereby obtaining a film (D-1) whose thickness was 75 μm. A glass transition temperature of each of the films (C-1) and (D-1) was 129° C. Further, the number of foreign substances in the film (C-1) was 180/m². Results of various measurements carried out with respect to the films (C-1) and (D-1) are shown in Table 1.

Further, a transmitted electron image indicative of a cross section of the film (C-1) was observed with a scanning electron microscope so as to find out dispersibility of the organic fin particles (B-1) in the acrylic resin (A-1). As a result, particles each of which has a diameter of about 0.1 μm were evenly dispersed, and any clump of organic fine particles was not observed.

Example 2

The acrylic resin (A-1) obtained in Production Example 1 and the organic fine particles (B-2) obtained in Production Example 3 were kneaded by a twin-screw extruder (cylinder diameter: 20 mm) at 280° C. while being fed by a feeder at such a weight ratio that acrylic resin (A-1)/organic fine particles (B-2)=80/20, and the kneaded resultant was filtrated with a leaf disk-type polymer filter (Nagase & Company, Ltd., filtration accuracy was 5 μm), thereby obtaining a pellet. Further, a single-screw extruder was used to melt-extrude the resultant from a coat hanger T die (width: 150 mm), thereby forming a film (C-2) whose thickness was 100 μm (unstretched film). Results of various measurements carried out with respect to the film are shown in Table 1. Further, the film (C-2) was uniaxially stretched 1.5 times (at 140° C. for 30 seconds) with an autograph (AGS-100D produced by Shimazu Corporation), thereby obtaining a film (D-2) whose thickness was 75 μm. A glass transition temperature of each of the films (C-2) and (D-2) was 128° C. Further, the number of foreign substances in the film (C-2) was 200/m². Results of various measurements carried out with respect to the films (C-2) and (D-2) are shown in Table 1.

Further, a transmitted electron image indicative of a cross section of the film (C-2) was observed with a scanning electron microscope so as to find out dispersibility of the organic fin particles (B-2) in the acrylic resin (A-1). As a result, particles each of which has a diameter of about 0.2 μm were evenly dispersed, and any clump of organic fine particles was not observed.

Comparative Example 1

A single-screw extruder was used to melt-extrude the acrylic resin (A-1), obtained in Production Example 1, from a coat hanger T die (width: 150 mm) at 260° C., thereby forming a film (C-3) whose thickness was 100 μm (unstretched film). Further, the film (C-3) was uniaxially stretched by a factor of 1.5 (at 140° C. for 30 seconds) with an autograph (AGS-100D produced by Shimazu Corporation), thereby obtaining a film (D-3) whose thickness was 75 μm. Results of various measurements carried out with respect to the films (C-3) and (D-3) are shown in Table 1.

Comparative Example 2

The acrylic resin (A-1) obtained in Production Example 1 and the organic fine particles (B-3) obtained in Production Example 4 were kneaded by a twin-screw extruder (cylinder diameter: 20 mm) at 260° C. while being fed by a feeder at such a weight ratio that acrylic resin (A-1)/organic fine particles (B-3)=80/20. Then, the experimenter tried to filtrate the kneaded resultant with a leaf disk-type polymer filter (Nagase & Company, Ltd., filtration accuracy was 5 μm), but a resin pressure (inlet pressure) suddenly increased, so that the experimenter stopped operation of the device.

Then, the kneading operation was carried out under the same condition as in Example 1 except that the polymer filter was not used for the filtration, and the resultant pellet was formed into a film by heat press (240° C.), thereby obtaining a film whose thickness was 130 μm.

The flexibility and the cutter cutting property of the resultant film were evaluated as ○, but its haze was 36%.

Further, a transmitted electron image indicative of a cross section of the film was observed with a scanning electron microscope so as to find out dispersibility of the organic fin particles (B-3) in the acrylic resin (A-1). As a result, a clump of organic fine particles which had a diameter of about 1 to 3 μm was found.

TABLE 1

| Examples | Film | Thickness (μm) | Retardation (nm) per 100 μm | Haze (%) | Flexi- bility | Cutter cutting property |
|---|---|---|---|---|---|---|
| Example 1 | C-1 | 100 | 0.6 | 0.6 | ○ | ○ |
|  | D-1 | 75 | 2.2 | 0.5 | ○ | ○ |
| Example 2 | C-2 | 100 | 0.8 | 1.0 | ○ | ○ |
|  | D-2 | 75 | 3.2 | 0.9 | ○ | ○ |
| Comparative | C-3 | 100 | 1.1 | 0.3 | X | X |
| Example 1 | D-3 | 75 | 32.1 | 0.3 | Δ | Δ |

As shown in Table 1, the unstretched film (C-3) of Comparative Example 1 had no organic fine particles, so that the film (C-3) was inferior in the flexibility and the cutter cutting property. Further, in the stretched film (D-1) of Comparative Example 1, the stretching caused the flexibility and the cutter cutting property to be improved, but its retardation increased by a factor of 30 or more In contrast, as apparent from Table 1, each of the films of Examples 1 and 2 had a lactone ring structure whose retardation was positive but had a structural unit giving a negative retardation, so that the film had not only excellent transparency and heat resistance but also desired properties such as a less coloring property, a mechanical strength, a film formation processability, and the like. Particularly, its in-plane retardation was extremely small even after stretching the film 1.5 times.

INDUSTRIAL APPLICABILITY

The resin composition of the present invention has not only excellent transparency and heat resistance but also desired properties such as a less coloring property, a mechanical strength, a film formation processability, and the like, and also has high optical isotropy. Thus, the resin composition can be widely used for optical purpose and the like, and can be favorably used in a field related to optical materials particularly.

The invention claimed is:
1. A film made of a resin composition, said film comprising:
an acrylic resin as a main component; and
organic fine particles whose average particle diameter ranges from 0.01 μm to 1 μm, wherein:

a glass transition temperature of the acrylic resin ranges from 110° C. to 200° C., each of the organic fine particles has a core-shell structure, and a core of the core-shell structure is crosslinked, a shell of the core-shell structure has a structural unit of a vinyl cyanide monomer and a structural unit of an aromatic vinyl monomer, an amount of the acrylic resin included in the resin composition ranges from 50 wt % to 95 wt %, and an amount of the organic fine particles included in the resin composition ranges from 5 wt % to 50 wt %, and a number of foreign substances whose particle diameter is 20 μm or more is 1000/m² or less.

2. The film as set forth in claim 1, wherein: a haze of the film is 1% or less.

3. The film as set forth in claim 2, wherein the film has an in-plane retardation of 10 nm or less per 100 μm thickness.

4. The film as set forth in claim 3, wherein the film is a stretched film.

5. The film as set forth in claim 4, wherein the acrylic resin has a lactone ring structure.

* * * * *